Nov. 4, 1941. A. F. JELINEK ET AL 2,261,379
THREADING DIE ATTACHMENT FOR AUTOMATIC SCREW MACHINES
Filed March 4, 1940 2 Sheets-Sheet 1

INVENTORS
ALFRED F. JELINEK
WALTER E. GROSS
ATTORNEYS.

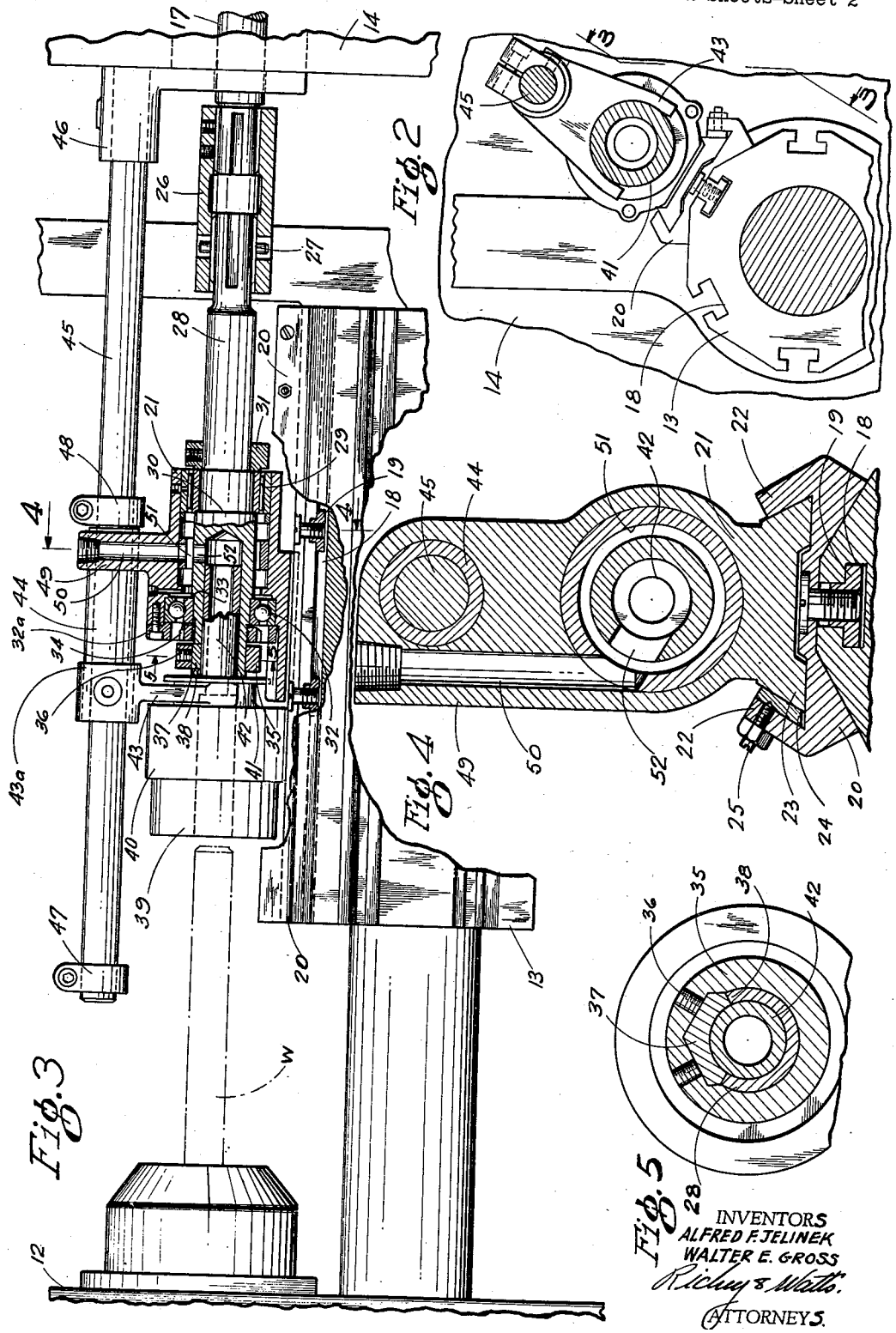

Patented Nov. 4, 1941

2,261,379

UNITED STATES PATENT OFFICE 2,261,379

THREADING DIE ATTACHMENT FOR AUTOMATIC SCREW MACHINES

Alfred F. Jelinek and Walter E. Gross, Cleveland, Ohio, assignors to The Cleveland Automatic Machine Company, Cleveland, Ohio, a corporation of Ohio Application March 4, 1940, Serial No. 322,189

3 Claims. (Cl. 29—57)

This invention relates broadly to multi-spindle screw machines and more specifically to improvements in die head supporting mechanisms therefor.

One of the objects of the invention is to provide a die operating and supporting mechanism which is adapted for ready assembly upon the machine and constructed to afford accessibility to the mechanisms for changing the length of the thread upon the work after the die and operating mechanism is mounted upon the machine.

Another object of the invention is to provide a die supporting mechanism which is formed to accommodate the circulation of a sufficient quantity of cutting compound therethrough to flush the chips from the work piece and die chasers.

Another object of the invention is to construct a die head supporting structure which is economic of manufacture, rigid of structure and dependable of operation with precision and dispatch.

Other objects and advantages more or less ancillary to the foregoing and the manner in which all the various objects are realized will appear in the following description.

Referring to the drawings wherein the preferred embodiment of the invention is illustrated:

Fig. 2 is a transverse sectional view of a fragmentary portion of the machine and die supporting structure, the section being taken on a plane indicated by the line 2—2 in Fig. 1;

Fig. 3 is a fragmentary view of a portion of the tool slide and machine head illustrated in Fig. 1, including the improved die head support, portions of which are broken away and in the interest of clarity shown in section;

Fig. 4 is a vertical section through a portion of the improved die head supporting structure, the section being taken on the plane indicated by the line 4—4 in Fig. 3; and Fig. 5 is a transverse sectional view through the connection between the shank of the die head and the supporting mechanism, the section being taken on a plane indicated by the line 5—5 in Fig. 3.

Figure 1:
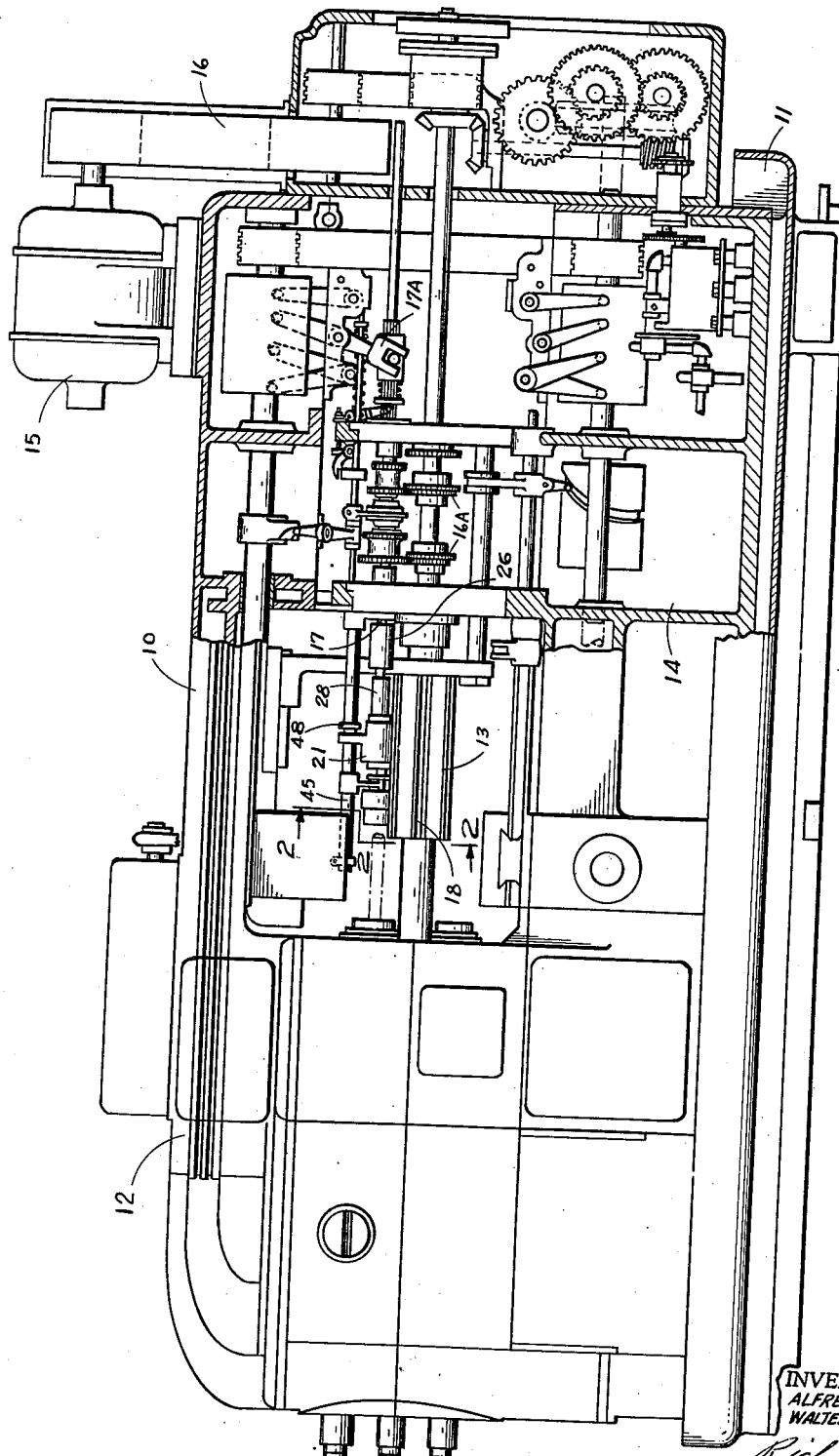
Fig. 1 is a front elevational view of an automatic multi-spindle screw machine having a portion of the outer casing removed therefrom to show the mechanism for reciprocating one of the auxiliary tool holders.

As illustrated in Fig. 1, the screw machine 10 comprises a base 11, a work holding spindle head 12 mounted thereon, a tool slide 13 and a housing 14 within which the driving connections for reciprocating the rotatively driven tools are mounted. The die head is carried by the tool slide 13 and as illustratively shown herein, is rotatively driven from an electric motor 15 through a chain belt 16 and gearing 16—a to effect the desired speed ratio between the die head drive shaft 17 and the work holding spindle 12. As is customary in machines of this character the tool slide 13 and drive shaft 17 are operatively connected with linkage 17—a to effect the independent reciprocation thereof in timed relation with the stock feed and turning tool operating mechanisms.

As will be seen in Figs. 1 and 4, the tool slide 13 is of the form which embodies a plurality of tool supporting faces having longitudinal T-slots 18 therein, which in the instant case are provided with nuts 19 for the securement of a saddle 20 adapted to support the die head carriage 21. The saddle 20 is constructed with vertically disposed convergent flanges 22 constituting guideways for the dovetailed base 23 of the carriage 21. Intermediate the flanges 22 and the base member 23 there is a gib 24 provided with screws 25 to accommodate adjustments compensative of wear resulting from the reciprocative movement of the carriage within the saddle.

Upon the end portion of the shaft 17 there is a sleeve 26 having a slot therein for the reception of a drive pin 27 pressed in the carriage spindle 28 adjacent the end thereof. In forming the slot in the sleeve 26 sufficient clearance is provided over the pin 27 to permit the die head to float until the stock is drawn into threaded engagement with the chasers. The spindle 28 is mounted upon a needle bearing 29 supported within the carriage 21 and retained therein against longitudinal movement by a set screw in the outer race and the impinged engagement of the inner race between a shoulder 30 in the spindle and a collar 31 mounted thereon. The outer end of the spindle 28 is mounted in an anti-friction bearing 32 supported within a recess counterbored to a suitable depth in the face of the carriage to facilitate the retention of the outer race of the bearing when the ring plate 32—a is drawn into impinged relation therewith. The inner race of the anti-friction bearing is supported between a shoulder 33 in the spindle 28 and a nut 34 mounted upon a threaded end portion of the spindle. Adjacent the nut 34 there is a collar 35 drilled and tapped for the reception of set screws 36 which are engaged with a shoe 37 disposed within the collar and seated in a transverse slot 38 milled in the spindle 28 adjacent the end thereof. The die head 39 is formed with a supporting shank 42 which is mounted within the bored end portion of the spindle 28 and preferably retained therein through the frictional engagement of the shoe 37 upon the periphery thereof. The die head chosen herein for purpose of illustration is of the type in which the retraction of the thread chasers, not shown, is effected through longitudinal movement of a sleeve or similar control member 40 mounted upon the inner end thereof. As shown, the sleeve 40 is formed with a groove 41 adjacent the end thereof within which there is a yoke 43 having an enlarged hub portion 43—a bored for the retention of a sleeve 44. The opposed end of the sleeve is guided freely in a vertically disposed boss formed in the carriage 21 intermediate the ends thereof. The sleeve 44 is machined for sliding engagement upon a rod 45 supported in a bracket 46 which is bolted to the face of the housing 14. Upon the rod 45 there is a collar 47 provided, when suitably adjusted, to arrest translation of the yoke 43 during the outward movement of the shaft 17, and thus move or adjust the sleeve 40 into the position where the thread chasers are retracted from their cutting engagement with the stock. The rod 45 is further provided with a collar 48 adapted for abutting engagement with the inner end of the sleeve 44 to arrest translation of the yoke 43 during the retraction of the shaft 17 and thus cause readjustment of the sleeve 40 and the consequent arrangement of the chasers into their cutting position with the work.

The vertical boss or arm 49 in the carriage is drilled to provide a passage 50 which is in fluid communication with an annular recess in the body of the carriage, constituting a chamber 51. The mouth of the passage 50 is threaded for the reception of a flexible conduit fitting, not shown, adapted for communication with a source of cutting compound which when forced into the chamber 51, will flow through an opening 52 in the spindle 28 and into the hollow shank 42 of the die head holder for the purpose of flushing the chips from the thread chasers and the work.

During the operation of the screw machine the tool slide 13 is reciprocated a predetermined distance toward and away from the work holding spindle 12, the carriage 21, however, will move only such distance as afforded through the linkage that controls the reciprocation of the drive shaft 17. The length of the thread to be chased upon the work piece is determined by adjustment of the collars 47 and 48 on the bar 45 which, as heretofore explained, control the actuation of the yoke 43 and in turn opening and closing of the die chasers in the die head 39.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. In a screw machine embodying a reciprocable tool slide, a plurality of work holding spindles concentric therewith and rotatable reciprocative tool drive shafts coaxial said spindles, a thread cutting mechanism therefor comprising a saddle mounted on said tool slide, a carriage mounted for reciprocative movement thereon, an antifriction bearing mounted on said coaxial drive shaft and housed in said carriage, a key seated in said drive shaft and carriage for the transmission of reciprocative movement from the shaft to the carriage, a collapsible die head mounted in said drive shaft, a rod mounted in the machine, a sleeve thereon guided in said carriage, a yoke mounted on said sleeve engaged with said collapsible die head, and collars adjustably mounted on said rod engageable with said sleeve.

2. A screw machine comprising a reciprocable tool slide, a plurality of work holding spindles concentric therewith, rotatable and reciprocative tool drive shafts coaxial said work holding spindles, a saddle constituting a longitudinal guideway mounted on said tool slide, a carriage mounted for reciprocative movement in said saddle, a gib in said saddle for adjusting said carriage into aligned relation with the confronting work holding spindle, a tool holding spindle journaled in said carriage, a die head mounted in said tool holding spindle, a universal coupling intermediate said tool holding spindle and the confronting tool drive shaft, a rod mounted on said machine, a yoke slidable thereon and engaged with said die head, stop collars on said rod engageable with said yoke and means on said tool holding spindle for the transmission of reciprocative movement from said tool drive shaft to said carriage.

3. In a screw machine embodying a reciprocable tool slide, work holding spindles concentric therewith and rotatable reciprocative tool drive shafts coaxially aligned therewith, a thread cutting mechanism therefor comprising a saddle mounted upon said tool slide, a carriage having a fluid passageway therein mounted for reciprocative movement in said saddle, a tool spindle having a fluid passageway therein journaled in said carriage, a die head having a fluid passageway therethrough mounted in said tool spindle, a coupling intermediate said tool spindle and said drive shaft, means in said coupling to facilitate the coaxial alignment of tool spindle with said drive shaft, a rod mounted on the machine, means thereon responsive the reciprocative movement of the carriage for opening and closing said die head, the fluid passageways in said carriage tool spindle and die head being in communication with each other to facilitate the circulation of a cutting compound therethrough and the removal of chips by the flushing action thereof.

ALFRED F. JELINEK.
WALTER E. GROSS.